April 13, 1943.  R. BLOODWORTH  2,316,393
CULTIVATING PLOW
Filed April 3, 1941
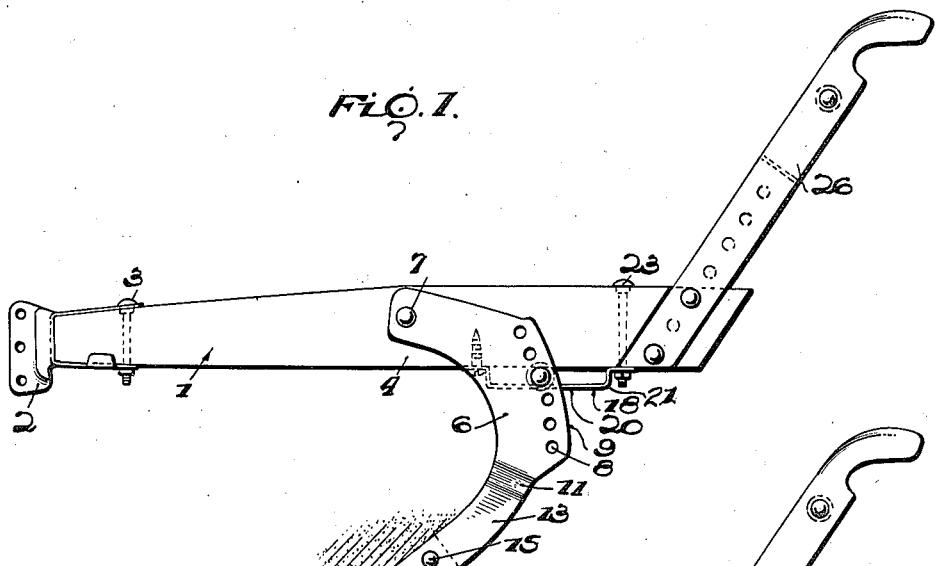
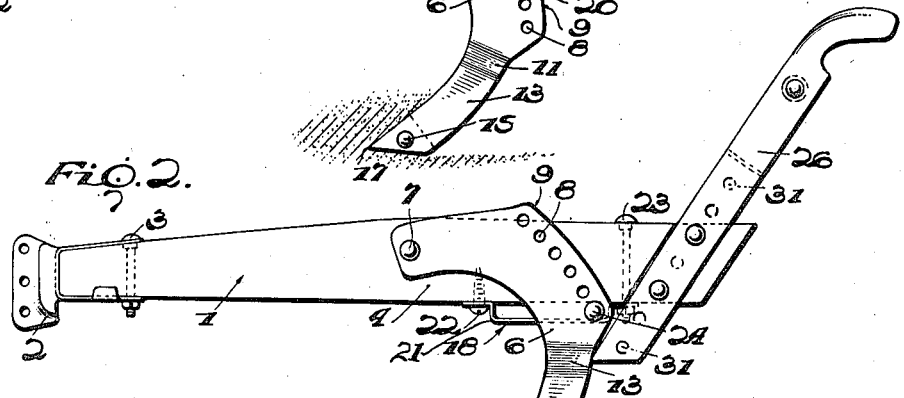
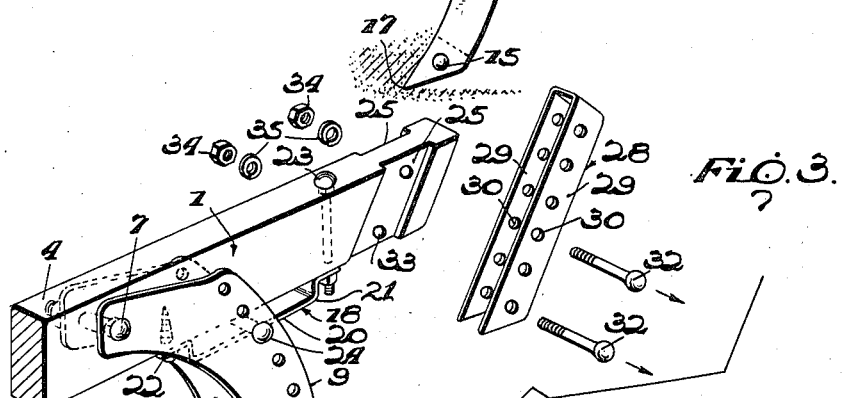
Inventor
Rainie Bloodworth.
By
Attorney Patented Apr. 13, 1943

2,316,393

UNITED STATES PATENT OFFICE 2,316,393

CULTIVATING PLOW

Rainie Bloodworth, Thomasville, Ga.

Application April 3, 1941, Serial No. 386,720

3 Claims. (Cl. 97—198.1)

My invention relates to cultivating plows and more particularly to improved means for adjustably mounting the foot and handle members of plow stocks.

Heretofore it has been suggested to mount the handles and foot member upon a plow beam whereby the relative height of the handles and foot, with respect to the beam, can be varied by the operator.

In this connection, it will be appreciated that in some circumstances, for example, when the earth working implement is set for a comparatively shallow cut, that it is desirable to provide means whereby the operator can adjust the height of the guide handles to compensate for the reduction in average plowing height of the beam. Similarly, when a deep cut is required, adjustability of the handles is desirable since the height thereof can be changed to meet the required plow condition and thus relieve the operator of undue strain and fatigue, by reason of the awkward positions encountered with handles of fixed height when making comparatively deep or shallow cuts.

The guide handles disclosed in my prior Patent 1,957,991 dated May 8, 1934 are pivotally mounted in the vicinity of the rear of the plow beam and a rack bar, arranged to receive a keeper associated with the handle support plates or brackets, is used for retaining the handles at the desired inclination with respect to the horizontal. While the cultivating stock disclosed and claimed in the patent is satisfactory for the purpose for which it was designed, I have found, after considerable study and experimentation, that in order to relieve undue strain on the operator, the adjustment of the foot to which the earth working implement is attached should be correlated with the handle adjustment, that is to say, I have found that there is a definite relation between the angle of cut and inclination and height of the handles, to afford minimum strain on the arms of the operator.

The present invention therefore, represents an improvement on the structure disclosed in my patent and comprehends a cultivating plow having a wide latitude of adjustment for the foot member and guide handles with respect to the beam, to compensate for the relative height of the members when the angle of cut is varied.

An object of my invention is to provide an improved cultivating plow.

Another object of my invention is to provide a cultivating plow having improved means for adjusting the heights of the plow foot and guide handles with respect to the plow beam.

Yet another object of my invention is to provide an improved cultivating plow having means to adjust the foot and handle members whereby the angle of cut and height of the handle members may be varied within comparatively wide limits.

Still another object of my invention is to provide a cultivating plow having improved means of adjustably mounting the handles and foot member on the plow beam.

A still further object of my invention is to provide a cultivating plow which is strong and sturdy in construction, and having means associated with the foot and handle members whereby the angle of cut and handle height can be quickly and easily adjusted.

With these and other objects in view, which may be incident to my improvements, the invention consists in the parts and combinations to be hereinafter set forth and claimed, with the understanding that the several necessary elements, comprising my invention may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawing:

Figure 1 is a side elevational view of a plow stock showing one position of the handle and plow foot.

Fig. 2 is a side elevational view of the plow stock showing the relative positions of the foot and handles when the handles are lowered; and Fig. 3 is a perspective view of the plow structure, partly in section, showing the adjustable mounting arrangements for the foot and handles.

Referring to the drawing and more particularly to Fig. 1, there is shown a cultivating plow comprising a beam 1, having a clevis 2 attached to its forward end by suitable bolt means 3. The plow beam, as shown, is of conventional shape, that is to say, it is tapered rearwardly from the front to a point 4 substantially midway of its ends.

In the vicinity of the indicated portion 4, a pair of substantially arcuate shaped plates 5 and 6 are pivotally attached to the beam by means of a bolt or other fastening device 7. Each of the plates is provided with a series of spaced openings 8 near its peripheral edge 9. It will be noted that the bodies of the plate members are bent inwardly as at 10 and 11 to form spaced parallel leg portions 12 and 13, between which there is positioned an earth working tool or implement 14, maintained in the operative position by bolt means 15, adapted for insertion through the legs 12 and 13 and the body portion of the earth working tool. The free ends of the legs, as shown, are cut to conform with the general configuration of the tool and it will be noted that they terminate in pointed portions 16 and 17 which form ground engaging sections adjacent the tool.

In order to adjustably support the plow foot formed by the plates 5 and 6 at different heights, that is to say, to vary the angle of cut of the earth working end of the foot, a suitable bracket, designated generally by numeral 18, is attached to the under side of the beam and forms a support for a bolt 24 adapted for insertion through a pair of registering openings 8 formed in the plates. The bracket, which may be formed from a flat strip of sheet metal, is provided with a central portion 20 and upwardly turned ends 21 by means of which it is attached to the lower surface of the plow beam through the medium of screw 22 and bolt 23, as shown. It will be noted that the flat central portion 20 of the bracket forms, with the under surface of the beam, a slot to receive a bolt 24, adapted for insertion through a pair of registering openings 8, formed in the plates. It will be thus be seen that the angle of cut of the plow foot can be quickly and easily varied by changing the position of the adjusting bolt 24 with respect to any pair of the screws of registering openings.

Referring to Fig. 3, the end of the plow beam to the rear of the foot member is formed with recesses 25 on opposite sides thereof, to receive suitable handle members 26. The recesses are cut at an angle to the horizontal and the handles are thus maintained at constant inclination, irrespective of the height above the plow beam.

Intermediate of the handles and the beam there is provided an adjustable spacing member designated generally by numeral 28, comprising arms 29 having a series of registering openings 30 therein. The spacing member is preferably formed from a single piece of material and provides, when folded as shown, a support for the handles when they are adjusted to an elevated position.

As will be seen in Fig. 1, the handles 26, only one shown, are in the elevated position, each handle member being provided with a series of spaced openings 31 adapted to register with the openings 30 formed in the arms of the spacing member. In order to securely clamp the handles in operative position on the beam, suitable bolts 32 are provided for insertion through the handles, arms of the spacing member, and openings 33 in the beam. Nuts 34 and lock washers 35 which fit over the protruding threaded ends of the bolts are used to adjustably tighten the members and support them in the desired adjustable position.

By means of the improved supporting arrangement for the foot and handle members, it will be appreciated that a comparatively wide latitude of adjustment of these elements can be obtained. The design of the plow foot supporting bracket is such that substantially all of the force due to upward thrust on the foot is exerted on the under surface of the beam, and that the only pull on the bracket is that due to the weight of the foot as the plow is lifted above or removed from the soil. Adjustment of the handles to a convenient height is easily made after the angle of cut has been determined and since the inclination of the handles is constant their vertical height or effective length can be varied to suit the convenience of the operator.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a cultivating plow, a plow beam, a plow foot pivotally attached to said beam, comprising a pair of spaced arcuate shaped plates having an earth working implement positioned therebetween, means to adjustably support the plates in operative position at different angles of cut, means to adjustably support a pair of plow handles at a fixed angle of inclination to the plow beam comprising, a pair of angularly disposed recesses on opposite sides of the beam to the rear of the plow foot, a handle spacing member having a pair of arms formed with a series of spaced registering openings, portions of said arms being seated in said recesses, a plow handle slidably seated in each of the recesses adjacent an arm of the spacer member, each of the handles having a series of spaced openings adapted to register with the openings in the spacer arms and bolt means insertable through the handles and the beam to securely clamp the handles in operative position on the beam.

2. In a cultivating plow, a plow beam, a plow foot pivotally attached to said beam comprising, a pair of spaced substantially arcuate shaped plates having an earth-engaging implement positioned therebetween in the vicinity of their free ends, means to adjustably support said plates in operative position at different angles of cut comprising, a bracket attached to the under side of the beam, a bolt extending transversely of the beam through the plates and between said bracket and the beam, each of said plates having openings along its peripheral edge to the rear of the earth working implement, the opposite openings in the plates being in register and forming with the bracket a series of bolt receiving passages, means to adjustably support a pair of plow handles at a fixed angle of inclination to the plow beam comprising, a pair of angularly disposed recesses on opposite sides of the beam to the rear of the plow foot, a handle spacing member having a pair of arms, portions of said arms being seated in said recesses, a plow handle slidably seated in each of the recesses and means insertable through the handles and the beam to securely clamp the handles in operative position on the beam.

3. In a cultivating plow, a plow beam, a plow foot pivotally attached to said beam comprising, a pair of spaced substantially arcuate shaped plates having an earth-engaging implement positioned therebetween in the vicinity of their free ends, means to adjustably support said plates in operative position at different angles of cut comprising, a bracket attached to the under side of the beam, a bolt extending transversely of the beam through the plates and between said bracket and the beam, each of said plates having openings along its peripheral edge to the rear of the earth working implement, the opposite openings in the plates being in register and forming with the bracket a series of bolt receiving passages, means to adjustably support a pair of plow handles at fixed angles of inclination to the plow beam comprising, a pair of angularly disposed recesses on opposite sides of the beam to the rear of the plow foot, a handle spacing member having a pair of arms formed with a series of spaced registering openings, a portion of said arms being seated in said recesses, a plow handle slidably seated in each of the recesses adjacent an arm of the spacer member, each of the handles having a series of spaced openings adapted to register with the openings in the arms of said spacer and bolt, means insertable through the handles and the beam to securely clamp the handles in operative position on the beam.

RAINIE BLOODWORTH.